Aug. 14, 1962
M. J. STURTEVANT
3,048,910
SNAP-ON CLIP STRUCTURE
Filed June 29, 1960
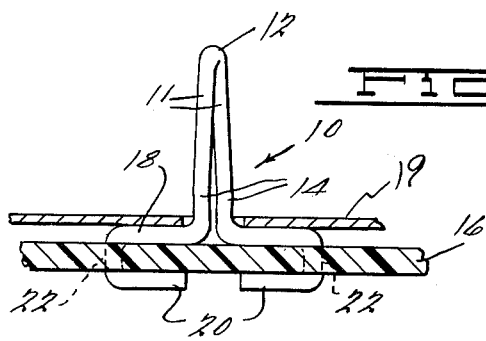
FIG. 1.
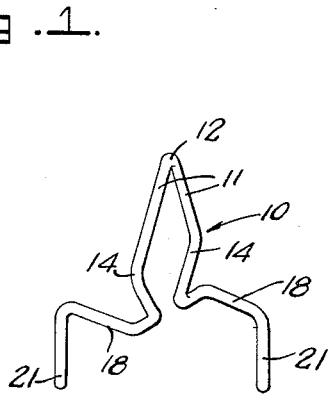
FIG. 5.
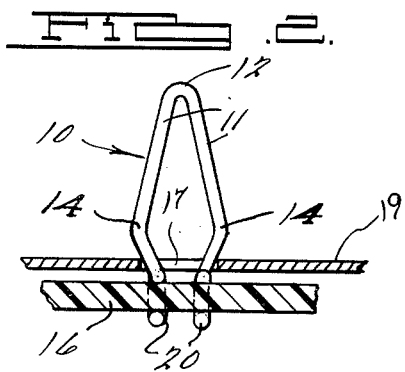
FIG. 2.
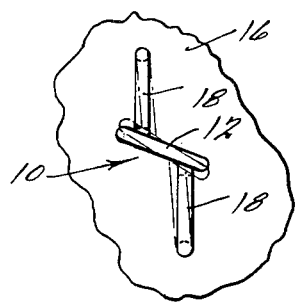
FIG. 4.
FIG. 3.
INVENTOR.
Mark J. Sturtevant
BY Harness and Harris
ATTORNEYS United States Patent Office 3,048,910
Patented Aug. 14, 1962

3,048,910
SNAP-ON CLIP STRUCTURE
Mark J. Sturtevant, Grosse Pointe, Mich., assignor to Chrysler Corporation, Highland Park, Mich., a corporation of Delaware
Filed June 29, 1960, Ser. No. 39,512
3 Claims. (Cl. 24—215)

This invention concerns improvements in snap-on clips of the type adapted for handling by a stapling gun.

Heretofore snap-on type clips have been utilized in such applications as securing material to which the clips have been stapled to an apertured metal panel and in many other applications, but a problem has frequently existed of over-stressing the clip as the legs thereof are forced through the panel aperture. When this occurs the clip is permanently deformed and fails to retain the desired fastening.

Clips are frequently used commercially in which leg portions having a widened shoulder are used to penetrate an aperture in a plate to retain the clip and another panel in assembled relationship with the apertured plate. However, most of these clips have an inherent disadvantage in that all deflection to accommodate entrance of the legs in the apertured plate must occur in the legs and there usually is positive means preventing distortion of other parts of the clip. For example, the patent to West No. 2,659,950 which issued Nov. 24, 1953, illustrates a device in which extensions on the ends of the legs are secured to a panel prior to insertion of the clip through an apertured plate. The extensions are located in the same plane as the legs, and the panel with which they are preassembled positively prohibits movement of the said extensions towards each other, so that the entire deformation of the clip must occur in a flattening of the clip leg shoulders as the clip legs penerate the aperture. This frequently causes an overstressing of the shoulders so that they remain flat and never restore themselves to the initial shouldered condition and the clip is thus incapable of retaining the parts in assembled relationship. I have found that by forming the terminal portions of the clip legs so that they extend laterally from the plane of the legs, even though the outer extremities thereof are confined, various twisting and torsional forces can be imposed upon the extensions to provide some of the distortion necessary to accommodate penetration of the apertured plate by the clip legs. In this way all of the distortion of the clip does not occur in a shoulder flattening operation and thus the shouldered portions avoid being overstressed and after assembly the shoulders still exist in their original shape and an improved fastening device is thus provided.

This invention is particularly concerned with clips of the generaly type adapted for preassembly by a stapling gun with a layer of material with the clips suitably deformed for permanent attachment to such material prior to subsequent assembly of the clip and material to an apertured plate.

It is an object of the invention to provide a snap-on clip with bowed leg portions carrying extensions projecting laterally of the plane of the leg portions to accommodate deflection of the bowed legs without overstressing the leg portions.

Another object is to provide a snap-over clip with a mounting means having stability in all directions and causing the clip to project from a first work piece in a stable manner while allowing the clip to become readily compressible when being assembled with another work piece.

Further objects and advantages of the present invention will become apparent from the following description and drawings, in which:

FIGURE 1 represents a view of the clip taken through its plane or major axis;
FIGURE 2 is a side view of the clip of FIGURE 1;
FIGURE 3 is a top view of the clip;
FIGURE 4 shows a variation in the securing structure for the clip; and
FIGURE 5 is a perspective view of the clip prior to its assembly with any panel.

Referring to the drawings, a clip generally designated by the numeral 10 is illustrated in FIG. 5 as formed with a pair of legs 11 which are bowed to provide cooperating shoulder means 14. The legs 11 are preferably, but not necessarily, connected at 12. Each leg 11 has an extension 18 projecting laterally from one of the opposite sides of a plane defined by the legs 11, and these extensions 18 each carry an end portion 21 which depends from its associated extension in a direction generally parallel to the plane defined by the legs 11. FIG. 5 illustrates the clip prior to its intended deformation, which may be accomplished by a stapling gun or by hand with conventional tools.

A sheet of material 16 is illustrated particularly in FIG. 1 and it will be noted that the clip 10 has been assembled therewith in FIG. 1 with the extension 18 in abutting relationship with one surface of material 16 and the end portions 21 of clip 10 penetrating the material 16 and deformed so that locking tabs 20 and intermediate portions 22 are formed from end portions 21. The locking tabs 20 are located on the opposite side of the material 16 and serve to permanently secure the clip to the material 16.

When the clip is subsequently assembled with an apertured plate 19 the legs 11 are forced toward each other and some deformation of shoulders 14 occurs. However, the places where deformation of shoulders 14 occurs are not the only places that distortion of the clip can occur to accommodate the necessary leg movement. Even though the portions 22 penetrate material 16, and the material 16, if it is of rigid nature, will resist movement of such intermediate portions 22 toward each other, it is still possible for extensions 18 to rotate relative to plate 16 to the dotted line position illustrated in FIG. 3. This distortion results in various bending and torsional distortions of extensions 18 and intermediate portions 22, and the particular type of distortion that occurs is secondary to the fact that means is provided which can distort to accommodate collapse of the legs without overstressing the shoulder portions 14 thereon.

The clip 10 may be conveniently formed from resilient wire, but may also be of thermoplastic or thermosetting resinous material for certain applications wherein metal clips are not desirable.

It is noted that applicant's mounting structure for his clip, even without the aid of the intermediate portion 22, allows greatly increased flexibility of the clip loop due to the freedom of motion of the extensions 18. This increased flexibility effectively prevents permanent compressive deformation of the loop when it is inserted through an anchoring aperture of a work piece.

Referring to FIGURES 2 and 3, the stability of the clip in regard to susceptibility of being rotated toward the work piece 16 is readily apparent. The relatively large distance between the extensions 18 and their length provide 360 degree stability to the clip during the initial fitting of its apex into the aperture 17 in work piece 19.

I claim:
1. In the combination of a snap-on wire-shaped clip and a work piece, said clip comprising a resilient snap over loop portion with its legs forming parallel extensions extending to either side of the plane of said loop portion, an intermediate resilient portion forming a pivot means on each of said extensions at a significant distance from said plane, bearing means on said work piece receiving said pivot means to provide pivot points for said extensions as said loop portion is forcibly altered in width, and locking means formed on said extensions engaging said work piece to resist rotation of said pivot means but to allow said pivot means to rotate within said bearing means by torsional twisting of said pivot means.

2. In an assembly comprising a pair of parts adapted to be disposed in juxtaposition, a fastener including a continuous metal element having a loop portion projecting from one side surface of one of said parts and provided with resiliently contractable opposite side legs, an extension extending outwardly from each side leg of said loop portion and outwardly from the plane of said loop portion adjacent said surface of said one part, said extensions being substantially parallel, an intermediate portion adjacent the outer end of each of said extensions extending through said one part, said intermediate portion respectively accommodating rotative yielding of their associated extensions during contraction of said loop portion, and clamping means extending from each of said intermediate portions adjacent the other side surface of said one part for retaining said fastener and said one part in assembled relationship.

3. The combination of a panel and a spring fastening device carried thereby for subsequent joinder of such panel to an apertured member, said fastening device comprising a part having resilient outwardly bowed leg portions in a first plane insertable through an aperture in a member and collapsible toward each other, said leg portions each terminating in an extension having a first portion connected to its associated leg portion, said first portions being parallel and each projecting laterally away from the above mentioned plane in parallel relationship with a surface of said panel and each of said leg portions also being provided with an end portion connected to the outer end of its associated first portion and secured to said panel.

References Cited in the file of this patent
UNITED STATES PATENTS

| | | |
|---|---|---|
| 2,077,120 | Lombard | Apr. 13, 1937 |
| 2,088,344 | Richardson | July 27, 1937 |
| 2,249,910 | Place | July 22, 1941 |